(12) United States Patent
Schmidt

(10) Patent No.: US 7,465,335 B2
(45) Date of Patent: *Dec. 16, 2008

(54) FUEL DEOXYGENATION SYSTEM WITH TEXTURED OXYGEN PERMEABLE MEMBRANE

(75) Inventor: Wayde R. Schmidt, Pomfret Center, CT (US)

(73) Assignee: United Technologies Corporation, Hartford, CT (US)

( * ) Notice: Subject to any disclaimer, the term of this patent is extended or adjusted under 35 U.S.C. 154(b) by 8 days.

This patent is subject to a terminal disclaimer.

(21) Appl. No.: 11/049,175

(22) Filed: Feb. 2, 2005

(65) Prior Publication Data

US 2006/0169138 A1  Aug. 3, 2006

(51) Int. Cl.
*B01D 53/22* (2006.01)
*B01D 19/00* (2006.01)

(52) U.S. Cl. ............... 95/46; 95/54; 96/6; 96/11

(58) Field of Classification Search .......... 96/4, 96/6, 11; 95/45, 54, 46, 263; 55/524, DIG. 5
See application file for complete search history.

(56) References Cited

U.S. PATENT DOCUMENTS

| | | | |
|---|---|---|---|
| 4,776,536 | A | 10/1988 | Hudson et al. |
| 5,158,557 | A | 10/1992 | Noreen et al. |
| 5,275,000 | A | 1/1994 | Coffinberry et al. |
| 5,423,178 | A | 6/1995 | Mains |
| 5,570,580 | A | 11/1996 | Mains |
| 5,604,297 | A | 2/1997 | Seiden et al. |
| 5,691,846 | A | 11/1997 | Benson, Jr. et al. |
| 5,701,148 | A * | 12/1997 | Moynihan et al. .............. 96/6 |
| 5,753,014 | A * | 5/1998 | Van Rijn ............... 55/DIG. 5 |
| 5,830,261 | A * | 11/1998 | Hamasaki et al. ................ 96/6 |
| 5,888,275 | A | 3/1999 | Hamasaki et al. |
| 5,939,174 | A | 8/1999 | Satoh |

(Continued)

FOREIGN PATENT DOCUMENTS

EP    0 081 182 A2    6/1983

(Continued)

OTHER PUBLICATIONS

D.E. Yount, E.W. Gillary, and D.C. Hoffman, "A Microscopic Invenstigation of Bubble Formation Nuclet", Journal of Acoustical Society of America, Nov. 1984, pp. 1511-1521.

(Continued)

*Primary Examiner*—Jason M Greene
(74) *Attorney, Agent, or Firm*—Carlson, Gaskey & Olds

(57) ABSTRACT

A fuel system for an energy conversion device includes a deoxygenator system with an oxygen permeable membrane having a textured surface. A sweep gas and/or vacuum maintains an oxygen concentration differential across the membrane to deoxygenate the fuel. The textured surface increases the surface area of the oxygen permeable membrane. The textured surface of the oxygen permeable membrane is fabricated by pressing the textured surface into the oxygen permeable membrane with a microreplication-based tooling system. Another fabrication method presses the textured surface into a sacrificial film and the oxygen permeable membrane is then formed upon the sacrificial film to transfer the textured surface to the oxygen permeable membrane and the sacrificial film is then subsequently removed. Another fabrication method applies additional material to the oxygen permeable membrane through a porous sacrificial film.

22 Claims, 4 Drawing Sheets

U.S. PATENT DOCUMENTS

| | | | |
|---|---|---|---|
| 6,026,644 A | 2/2000 | Ito et al. | |
| 6,235,187 B1 * | 5/2001 | Anderson et al. | 95/54 |
| 6,244,738 B1 | 6/2001 | Yasuda et al. | |
| 6,315,815 B1 * | 11/2001 | Spadaccini et al. | 96/6 |
| 6,514,412 B1 | 2/2003 | Insley et al. | |
| 6,576,357 B1 | 6/2003 | Helmolt | |
| 6,632,357 B1 * | 10/2003 | Barger et al. | 210/493.4 |
| 7,014,681 B2 * | 3/2006 | Noack et al. | 95/54 |
| 7,153,343 B2 * | 12/2006 | Burlatsky et al. | 96/6 |
| 7,231,769 B2 * | 6/2007 | Spadaccini et al. | 60/782 |
| 2002/0014449 A1 | 2/2002 | Rios et al. | |
| 2004/0028875 A1 | 2/2004 | Van Rijn et al. | |
| 2004/0194627 A1 * | 10/2004 | Huang et al. | 96/6 |
| 2006/0278073 A1 * | 12/2006 | McHugh | 96/6 |

FOREIGN PATENT DOCUMENTS

| | | |
|---|---|---|
| EP | 0 392 010 A | 10/1990 |
| EP | 0 932 010 * | 10/1990 |
| JP | 4197433 | 7/1992 |
| WO | WO 95/00231 | 1/1995 |

OTHER PUBLICATIONS

L.J. Spadaccini, H. Huang, "On-Line Fuel Deoxygenation for Coke Suppression", Journal of Engineering for Gas Turbines and Power, Jul. 2003, vol. 125, pp. 1-7.

Abraham D. Stroock, Stephan K. W. Dertinger, Armand Ajdari, Igor Mezic, Howard A. Stone, George M. Whitesides, "Chaotic Mixer for Microchannels", Science, vol. 295, Jan. 25, 2002, pp. 647-651.

Csaba Suri, Katsuhide Takenake, Yoshihiro Kojima and Kiyohito Koyama, "Experimental Study of a New Liquid Mixing Method Using Acoustic Streaming", Journal of Chemical Engineering of Japan, vol. 35, No. 6, pp. 297-602, 2002.

U.S. Appl. No. 10/735,200, filed Dec. 12, 2003, entitled "Acoustic Fuel Deoxygenation System".

U.S. Appl. No. 10/810,796, filed Mar. 26, 2004, entitled"Electrochemical Fuel Deoxygenation System".

U.S. Appl. No. 10/808,151, filed Mar. 24, 2004, entitled "Fuel Deoxygenation System".

European Search Report, dated May 31, 2006.

* cited by examiner

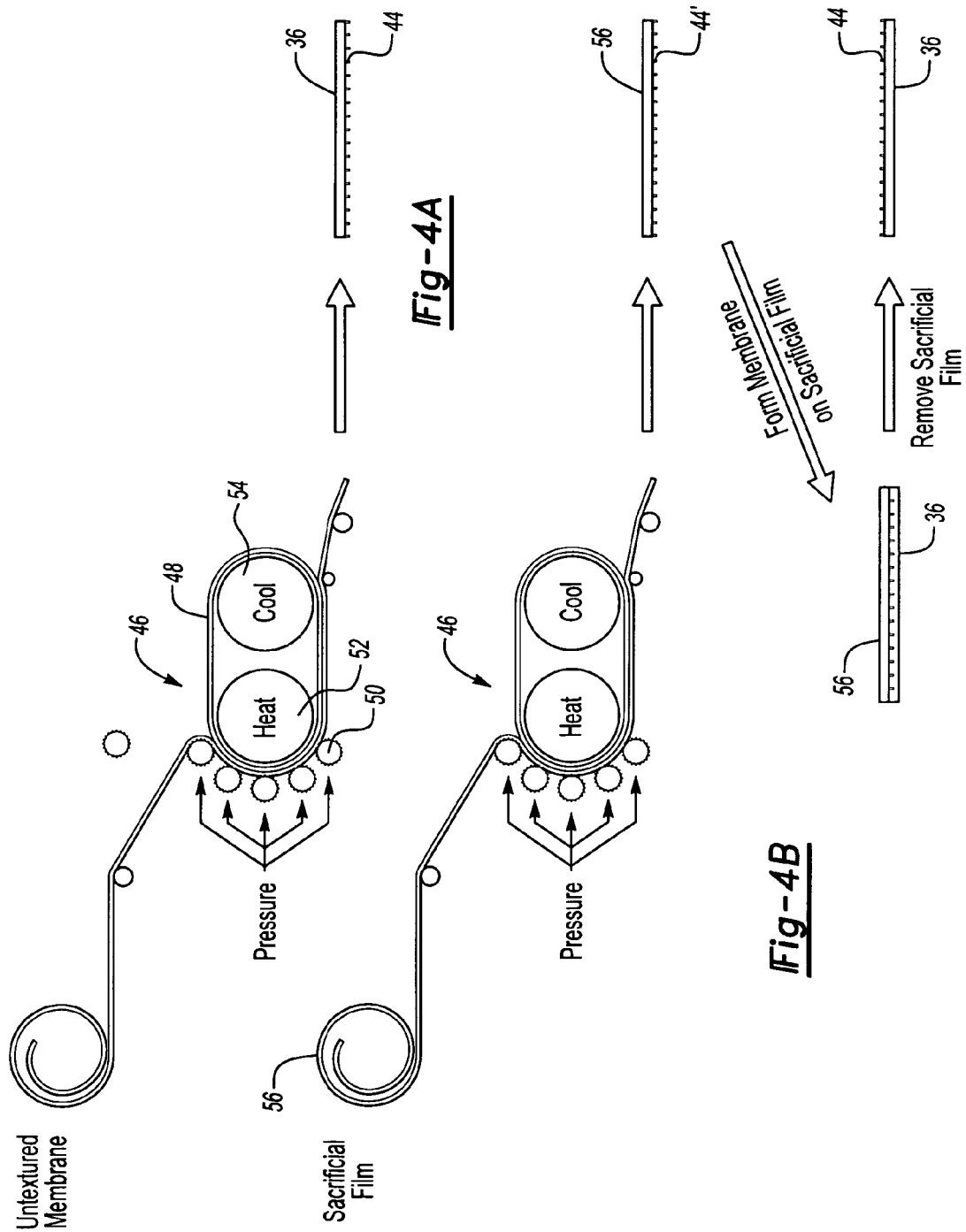

ficial film located adjacent to an original oxygen permeable membrane. Subsequently, the sacrificial film is removed, leaving a textured oxygen permeable membrane.

Still another fabrication method includes laying a porous, sacrificial film upon the membrane and depositing additional material through the sacrificial film such that it contacts the original membrane. The sacrificial film is subsequently removed, leaving a textured membrane.

FUEL DEOXYGENATION SYSTEM WITH TEXTURED OXYGEN PERMEABLE MEMBRANE

BACKGROUND OF THE INVENTION

The present invention relates to stabilizing fuel by deoxygenation, and more particularly to deoxygenation through a textured oxygen permeable membrane adjacent an oxygen receiving channel.

Jet fuel is often utilized in aircraft as a coolant for various aircraft systems. The presence of dissolved oxygen in hydrocarbon jet fuels may be objectionable because the oxygen supports oxidation reactions that yield undesirable by-products. Dissolution of air in jet fuel results in an approximately 70 ppm oxygen concentration. When aerated fuel is heated between 350° F. and 850° F. the oxygen initiates free radical reactions of the fuel resulting in deposits commonly referred to as "coke" or "coking." Coke may be detrimental to the fuel lines and may inhibit combustion. The formation of such deposits may impair the normal functioning of a fuel system, either with respect to an intended heat exchange function or the efficient injection of fuel.

Various conventional fuel deoxygenation techniques are currently utilized to deoxygenate fuel. Typically, lowering the oxygen concentration to 2 ppm is sufficient to overcome the coking problem.

One conventional Fuel Stabilization Unit (FSU) utilized in aircraft removes oxygen from jet fuel by producing an oxygen pressure gradient across a membrane permeable to oxygen. Although quite effective, the gradient is produced by vacuum on one side of the membrane. The membrane is relatively thin (~2-5 microns) and may lack mechanical integrity. As the vacuum introduces mechanical forces on the membrane, the membrane is supported on a porous backing plate, which may operate as a barrier to diffusion. The thin membrane may also require a relatively long flow path to assure significant surface contact with the fuel for effective deoxygenation thereof.

Accordingly, it is desirable to provide for the deoxygenation of hydrocarbon fuel in a size and weight efficient system that resists a vacuum across a relatively thin membrane.

SUMMARY OF THE INVENTION

A fuel system for an energy conversion device according to the present invention includes a deoxygenator system with an oxygen permeable membrane that includes a textured surface. A sweep gas and/or vacuum maintains an oxygen concentration differential across the membrane to deoxygenate the fuel. The textured surface increases the surface area of the oxygen permeable membrane. The textured surface also increases the strength and rigidity of the oxygen permeable membrane which permits minimization of a porous substrate to minimize the barrier to diffusion.

The textured surface of the oxygen permeable membrane is fabricated by pressing the textured surface into the oxygen permeable membrane with a microreplication-based tooling system.

Another fabrication method presses the textured surface into a sacrificial film and the oxygen permeable membrane is then formed upon the sacrificial film to transfer the textured surface to the oxygen permeable membrane. The sacrificial film is then subsequently removed resulting in the final oxygen permeable membrane with the textured surface formed thereon.

Still another fabrication method is the application of additional oxygen permeable membrane through a porous, sacri-

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 4A is a schematic view of a microreplication-based tooling system illustrating a method of forming the textured surface;

FIG. 4B is a schematic view of another microreplication-based tooling system illustrating a method of forming the textured surface.

DETAILED DESCRIPTION OF THE PREFERRED EMBODIMENT

Figure 1:
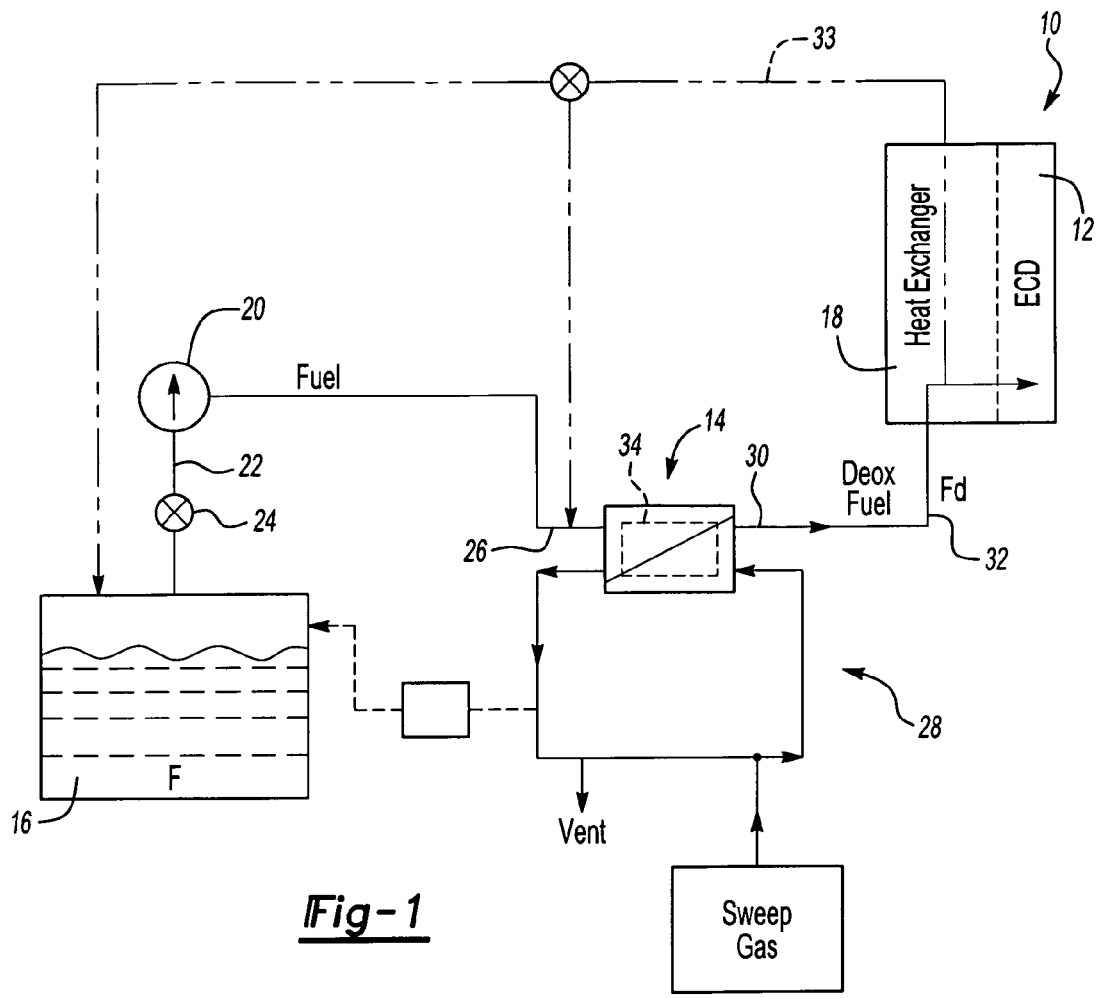
FIG. 1 is a general schematic block diagram of an energy conversion device (ECD) and an associated fuel system employing a fuel deoxygenator in accordance with the present invention.

FIG. 1 illustrates a general schematic view of a fuel system 10 for an energy conversion device (ECD) 12. A deoxygenator system 14 receives liquid fuel F from a reservoir 16 such as a fuel tank. The fuel F is typically a hydrocarbon such as jet fuel. The ECD 12 may exist in a variety of forms in which the fuel, at some point prior to eventual use for processing, for combustion or for some form of energy release, acquires sufficient heat to support autoxidation reactions and coking if dissolved oxygen is present to any significant extent in the fuel.

One form of the ECD 12 is a gas turbine engine, and particularly such engines in high performance aircraft. Typically, the fuel also serves as a coolant for one or more subsystems in the aircraft and becomes heated as it is delivered to fuel injectors immediately prior to combustion.

A heat exchange section 18 represents a system through which the fuel passes in a heat exchange relationship. It should be understood that the heat exchange section 18 may be directly associated with the ECD 12 and/or distributed elsewhere in the larger system 10. The heat exchange system 18 may alternatively or additionally include a multiple of heat exchanges distributed throughout the system.

As generally understood, fuel F stored in the reservoir 16 normally contains dissolved oxygen, possibly at a saturation level of 70 ppm. A fuel pump 20 draws the fuel F from the reservoir 16. The fuel pump 20 communicates with the reservoir 16 via a fuel reservoir conduit 22 and a valve 24 to a fuel inlet 26 of the deoxygenator system 14. The pressure applied by the fuel pump 20 assists in circulating the fuel F through the deoxygenator system 14 and other portions of the fuel system 10. As the fuel F passes through the deoxygenator system 14, oxygen is selectively removed into a sweep gas system 28.

The deoxygenated fuel Fd flows from a fuel outlet 30 of the deoxygenation system 14 via a deoxygenated fuel conduit 32, to the heat exchange system 18 and to the ECD 12 such as the fuel injectors of a gas turbine engine. A portion of the deoxygenated fuel may be recirculated, as represented by recirculation conduit 33 to either the deoxygenation system 14 and/or the reservoir 16. It should be understood that although a particular component arrangement is disclosed in the illustrated embodiment, other arrangements will benefit from the instant invention.

Figure 2:
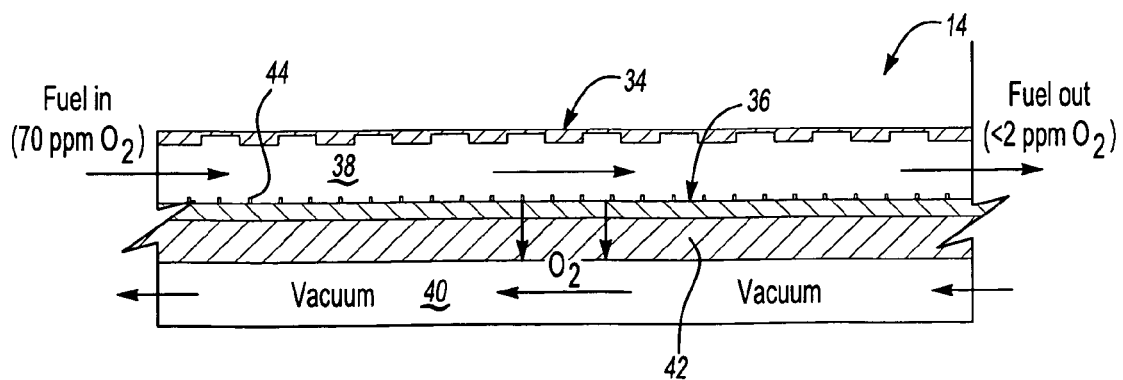
FIG. 2 is an expanded view of the oxygen permeable porous membrane between a fuel channel and a sweep gas channel.

Referring to FIG. 2, the deoxygenator system 14 in one non-limiting embodiment includes a multiple of gas/fuel micro-channel assemblies 34. The assemblies 34 include an oxygen permeable membrane 36 between a fuel channel 38 and an oxygen receiving channel such as a sweep gas channel 40. The sweep gas channel 40 in one non-limiting embodiment contains nitrogen and/or another inert gas. It should be understood that the channels may be of various shapes and arrangements to provide a pressure differential, which maintains an oxygen concentration differential across the membrane to deoxygenate the fuel. The fuel and the sweep gas preferably flow in opposite directions.

The oxygen permeable membrane 36 in one non-limiting embodiment includes porous membranes, which allow dissolved oxygen (and other gases) to diffuse through angstrom-size holes but exclude the larger fuel molecules, and permeable membranes which use a solution-diffusion mechanism to dissolve the oxygen (and the other gases) and allow it (or them) to diffuse through the membrane, while excluding the fuel. The family of polytetrafluoroethylene type compounds (PTFE), often identified under the trademark "Teflon" registered to E. I. DuPont de Nemours of Wilmington, Del., have proven to provide effective results for fuel deoxygenation. The PTFE material is believed to use a solution-diffusion mechanism, but may also operate via its porosity, depending on formulation and structure. A further example of a porous membrane material is a thin layer of 50 Angstrom porous alumina ceramic, or zeolite. A further example of a permeable membrane is a thin layer of silicone rubber. The bare membrane may be used or it may be modified through subsequent operations including, but not limited to chemical reactions, physical processes, radiation treatment (including exposure to X-rays, visible light, infrared, microwave, ultrasonics) and combinations thereof. Multiple membranes of varied composition and performance parameters may also be used in combination.

In operation, fuel flowing through the fuel channel 38 is in contact with the oxygen permeable membrane 36. Vacuum creates an oxygen partial pressure differential between the inner walls of the fuel channel 38 and the oxygen permeable membrane 36 which causes diffusion of oxygen dissolved within the fuel to migrate through a porous substrate 42 which supports the membrane 36 and out of the deoxygenator system 14 through the sweep gas channel 40 separate from the fuel channel 38. In the micro channel, fully filled with the fuel stream, the concentration of the flammable volatiles is minimized and oxygen is removed through the oxygen permeable membrane 36 (by pressure difference across the membrane 36) after bubble discharge on the membrane wall.

It should be understood that the fuel channel 38 disclosed in the illustrated embodiment is exemplary and the fuel channel 38 may be a micro-channel within a membrane based fuel deoxygenator system, a conduit, a passage, and/or any other fuel communication system other than a reservoir 16 (FIG. 1). For further understanding of other aspects of one membrane based fuel deoxygenator system and associated components thereof, attention is directed to U.S. Pat. No. 6,315,815 and U.S. patent application Ser. No.: 10/407,004 entitled PLANAR MEMBRANE DEOXYGENATOR which are assigned to the assignee of the instant invention and which are hereby incorporated herein in their entirety.

The oxygen permeable membrane 36 preferably includes a textured surface 44. The textured surface 44 increases the surface area of the oxygen permeable membrane 36 which results in increased oxygen removal. The textured surface 44 increases the surface area of the oxygen permeable membrane 36 and also increases the robustness (for example the strength and rigidity) of the oxygen permeable membrane 36 which permits minimization of the porous substrate 42 to minimize the barrier to diffusion. That is, the porous substrate 42 may provide increased porosity as decreased support of the oxygen permeable membrane 36 is required.

Figure 3A:
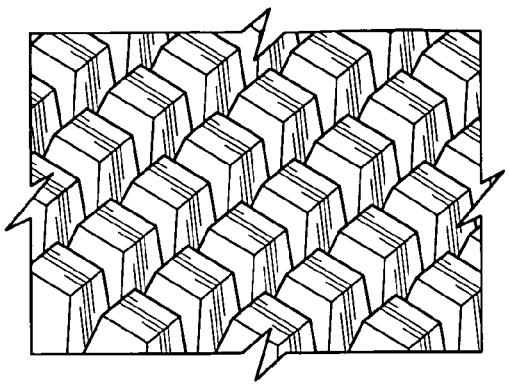
FIG. 3A is an expanded view of a textured surface of an oxygen permeable membrane.
Figure 3B:
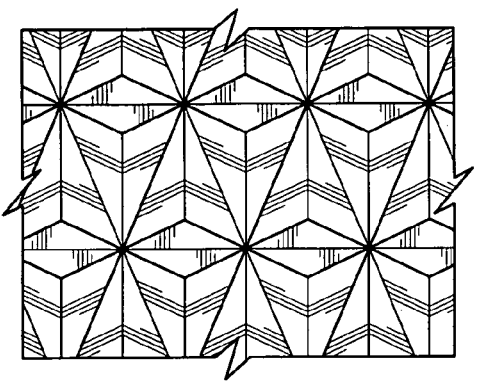
FIG. 3B is an expanded view of a textured surface of an oxygen permeable membrane.
Figure 3C:
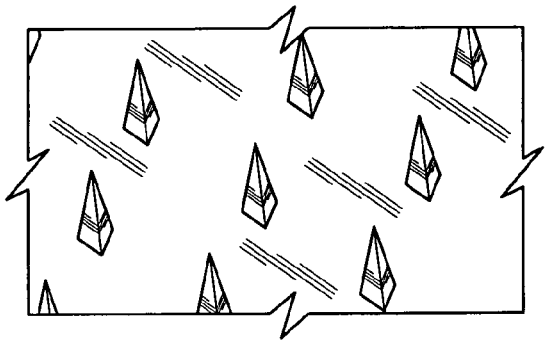
FIG. 3C is an expanded view of a textured surface of an oxygen permeable membrane.
Figure 3D:
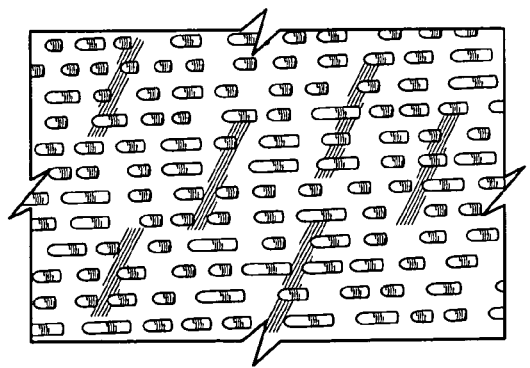
FIG. 3D is an expanded view of a textured surface of an oxygen permeable membrane.
Figure 3E:
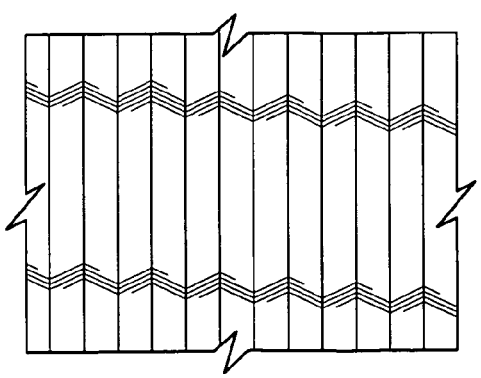
FIG. 3E is an expanded view of a textured surface of an oxygen permeable membrane.

The textured surface 44 in one non-limiting embodiment includes microstructure features with dimension ranging from 100 nm to greater than 200 microns with aspect ratios of up to 4:1 and most preferably with dimension less than 100 microns. The textured surface 44 may be manufactured as positive features such as hills, or posts (FIG. 3A), diamonds (FIG. 3B), peaks, needles (FIG. 3C), pins, knobs or ridges (FIG. 3D), and such like or negative features such as wells, grooves, v-shaped channels (FIG. 3E), valleys and such like or any combination thereof relative to the base plane of the membrane and the porous substrate 42. Other suitable microstructure features include microwells, microfluidic channels, through-holes or such like. It should be understood that the textured surface 44 may be oriented relative the porous substrate 42 such that positive and negative features are relative thereto. Membrane textures can be designed to satisfy fluid flow needs, dimensional characteristics of the membrane, physical properties of the membrane, as well as tooling fabrication limitations. Compositions of the textures can be designed to satisfy added needs of chemical functionality, chemical compatibility, oxygen permeation rate enhancement and catalytic enhancements.

The textured surface 44 may be orientated and located in various ways including locating the textured surface on one or both sides of the oxygen permeable membrane 36. Entire or partial surface areas of the oxygen permeable membrane 36 may include the textured surface 44. A consistent textured surface 44 may be formed throughout the oxygen permeable membrane 36 or different textured surfaces 44 may be formed on different areas of the oxygen permeable membrane 36 membrane to optimize fuel deoxygenation performance characteristics. Furthermore, laminated oxygen permeable membranes 36-e.g. two or more polymer layers with different characteristics, and with different textured surfaces may also benefit from the present invention.

Referring to FIG. 4A, the textured surface 44 of the oxygen permeable membrane 36 is preferably fabricated by pressing the textured surface 44 into the oxygen permeable membrane 36 with a microreplication-based tooling system (illustrated schematically at 46). The oxygen permeable membrane 36 suitable for FSU applications is introduced into a roller system 48 of the tooling system 46 such that the oxygen permeable membrane 36 is pressed under a set of micro feature rollers 50 which have the microstructure features formed thereon. That is, the micro feature rollers 50 include the reverse of the microstructure features such that rolling the micro feature rollers 50 over the oxygen permeable membrane 36 transfers the textured surface into the oxygen permeable membrane 36. The micro feature rollers 50 press the textured surface 44 into the oxygen permeable membrane 36 as the oxygen permeable membrane 36 is subjected to a heat roller 52 such that the textured surface 44 is formed directly into the oxygen permeable membrane 36. The oxygen permeable membrane 36 is then passed over a cooling roller 54 such that the textured surface 44 is fixed into the oxygen permeable membrane 36.

Referring to FIG. 4B, an indirect fabrication method includes pressing a textured surface 44' into a sacrificial film 56 in a manner as described in FIG. 4A. The oxygen permeable membrane 36 is then formed upon the sacrificial film 56 to transfer the textured surface 44 to the oxygen permeable membrane 36. The oxygen permeable membrane 36 is preferably formed upon the sacrificial film 56 through various known processes such as lamination, solvent casting, precipitation, vapor-deposition, and/or a combination of these or such like processes. The sacrificial film 56 is then subsequently removed though dissolution, thermal degradation, lift-off, and other suitable removal techniques, resulting in the final oxygen permeable membrane 36 with the textured surface 44 formed thereon.

Figure 4C:
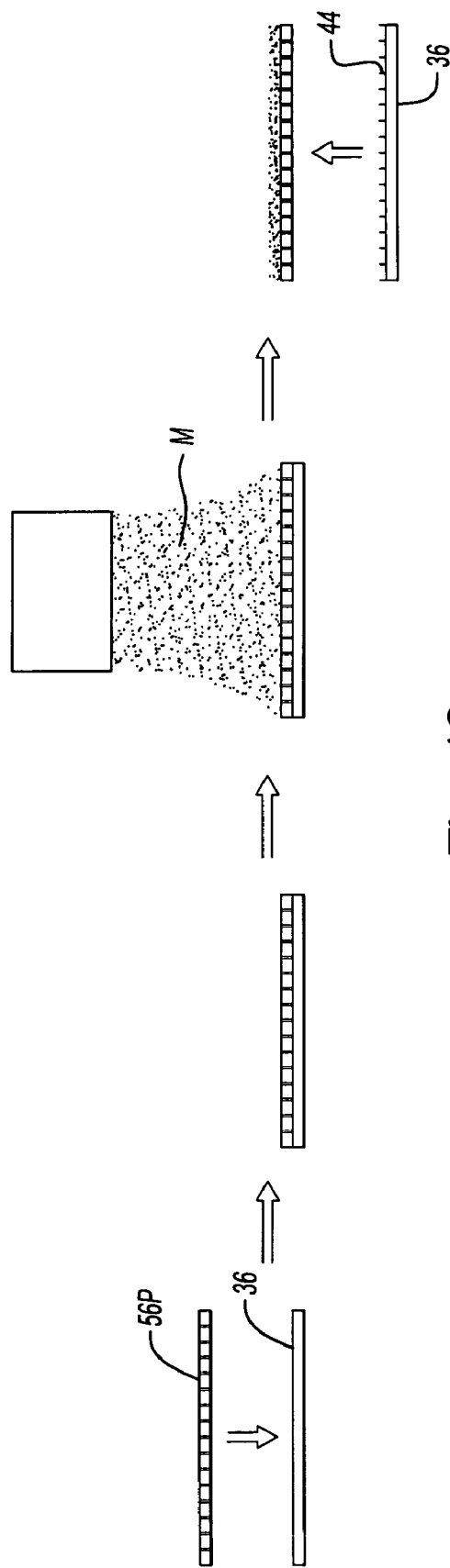
FIG. 4C is a schematic view of another method of forming the textured surface through the application of additional oxygen permeable membrane.

Referring to FIG. 4C, another fabrication method applies additional oxygen permeable membrane material M through a porous sacrificial film 56p located adjacent the original oxygen permeable membrane 36 such that the added membrane material M adheres to the oxygen permeable membrane 36 through the porous sacrificial film 56p. The additional oxygen permeable membrane material M is in one non-limiting embodiment in the form of a liquid solution whose solvent can be later removed, a volatile species which can be condensed, or solid forms such as films, particulate, composites, or combinations thereof. Subsequently, the porous sacrificial film 56p is removed, leaving the oxygen permeable membrane 36 with the textured surface 44 formed by the additional oxygen permeable membrane material M.

Alternatively, the material M may be a material different than the membrane material such as a metal, ceramic, polymer or combinations thereof, in forms of films, particulate, composites or combinations thereof. For example only, the electroplating of metal features on an oxygen permeable membrane through a sacrificial porous film results in a metal-textured textured oxygen permeable membrane. The metal or other material is preferably selected to provide catalytic function to the oxygen permeable membrane or to enhance the permeation rate of oxygen through the oxygen permeable membrane.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A fuel system comprising:
   a fuel channel;
   an oxygen receiving channel; and
   an oxygen permeable membrane in communication with said fuel channel and said oxygen receiving channel, said oxygen permeable membrane having a textured surface.

2. The fuel system as recited in claim 1, wherein said textured surface faces said fuel channel.

3. The fuel system as recited in claim 1, wherein said oxygen permeable membrane is unsupported.

4. The fuel system as recited in claim 1, wherein said oxygen permeable membrane is supported upon a porous substrate.

5. The fuel system as recited in claim 1, wherein said oxygen receiving channel communicates an inert gas therethrough.

6. The fuel system as recited in claim 1, wherein said textured surface includes microstructure features with dimension less than 100 microns.

7. The fuel system as recited in claim 1, wherein said textured surface includes microstructure features which define a diamond pattern.

8. The fuel system as recited in claim 1, wherein said textured surface includes microstructure features which define a multiple of V-shaped channels.

9. The fuel system as recited in claim 1, wherein said textured surface includes microstructure features which define a multiple of microposts.

10. The fuel system as recited in claim 1, wherein said textured surface includes microstructure features which define a multiple of ridges.

11. The fuel system as recited in claim 1, wherein said textured surface includes microstructure features which define a multiple of microneedles.

12. The fuel system as recited in claim 1, wherein said oxygen receiving channel includes a vacuum.

13. A method of fabricating an oxygen permeable membrane for minimizing dissolved oxygen from within a fuel system comprising the steps of:
   (a) applying a textured surface to an oxygen permeable membrane; and
   (b) locating the oxygen permeable membrane adjacent an oxygen receiving channel and a fuel channel.

14. A method as recited in claim 13, further comprising the step of:
   facing the textured surface toward the fuel channel.

15. A method as recited in claim 13, further comprising the steps of:
   (a) pressing a textured surface into a sacrificial film;
   (b) forming an oxygen permeable membrane upon the sacrificial film to transfer the textured surface to the oxygen permeable membrane; and
   (c) removing the sacrificial film from the oxygen permeable membrane.

16. A method as recited in claim 13, further comprising the steps of:
   (a) applying a porous sacrificial film to the membrane oxygen permeable membrane;
   (b) applying a material to the oxygen permeable membrane through the porous sacrificial film to form the textured surface upon the oxygen permeable membrane; and (c) removing the porous sacrificial film from the oxygen permeable membrane.

17. A method as recited in claim 16, wherein said step (b) includes:

applying the material as oxygen permeable membrane material.

18. A method as recited in claim 16, wherein said step (b) includes:

applying the material to the oxygen permeable membrane material to enhance the permeation rate of oxygen through the oxygen permeable membrane.

19. A method as recited in claim 16, wherein said step (b) includes:

applying the material to provide a catalytic function to the oxygen permeable membrane.

20. A method of minimizing dissolved oxygen from within a fuel system comprising the steps of:

(1) locating an oxygen permeable membrane having a textured surface adjacent a liquid fuel flow containing a dissolved oxygen; and (2) providing an oxygen concentration differential adjacent the oxygen permeable membrane opposite the liquid fuel flow to draw oxygen from the liquid fuel flow through the oxygen permeable membrane.

21. The fuel system as recited in claim 1, wherein said textured surface is formed into said oxygen permeable membrane.

22. The fuel system as recited in claim 1, wherein said textured surface is formed onto said oxygen permeable membrane.

* * * * *